United States Patent
Davis et al.

(10) Patent No.: US 12,450,805 B2
(45) Date of Patent: Oct. 21, 2025

(54) ACCIDENT RE-CREATION USING AUGMENTED REALITY

(71) Applicant: Allstate Insurance Company, Northbrook, IL (US)

(72) Inventors: Chase Davis, Richardson, TX (US); Jeraldine Dahlman, Evanston, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/590,770

(22) Filed: Feb. 28, 2024

(65) Prior Publication Data
US 2024/0331240 A1    Oct. 3, 2024

Related U.S. Application Data

(63) Continuation of application No. 17/516,439, filed on Nov. 1, 2021, now Pat. No. 11,922,548, which is a
(Continued)

(51) Int. Cl.
*G06T 11/60* (2006.01)
*G06F 16/29* (2019.01)
(Continued)

(52) U.S. Cl.
CPC .............. *G06T 11/60* (2013.01); *G06F 16/29* (2019.01); *G06Q 40/08* (2013.01); *H04N 23/90* (2023.01);
(Continued)

(58) Field of Classification Search
CPC ..... G06T 11/60; G06T 2200/24; G06F 16/29; G06Q 40/08
See application file for complete search history.

(56) References Cited

U.S. PATENT DOCUMENTS

| 6,166,744 A | 12/2000 | Jaszlics et al. |
| 9,691,189 B1 | 6/2017 | Creath |

(Continued)

FOREIGN PATENT DOCUMENTS

| CN | 100585640 C | 1/2010 |
| CN | 102034257 A | 4/2011 |

(Continued)

OTHER PUBLICATIONS

Crash Data Services, "Expert Accident Reconstruction and Investigation Details," retrieved from http://www.crashdataservices.net/AIDetails.html, 2 pages (2016).

(Continued)

*Primary Examiner* — Grace Q Li
(74) *Attorney, Agent, or Firm* — Akerman LLP

(57) ABSTRACT

Systems, devices, and methods provide an augmented reality visualization of a real world accident scene. The system may comprise an augmented reality visualization device in communication with a display interface. The display interface may be configured to present a graphical user interface including an accident scene that corresponds to a real world location. The augmented reality visualization device (and/or system) may comprise one or more data stores configured to store accident scene information corresponding to the real world location, such as vehicles, motorcycles, trees, road objects, etc. Additionally, the one or more data stores may also store participant information corresponding to details about other multiple participants, such as witnesses, other drivers, and/or police officers.

20 Claims, 8 Drawing Sheets

Related U.S. Application Data continuation of application No. 16/884,515, filed on May 27, 2020, now Pat. No. 11,164,356, which is a continuation of application No. 16/438,097, filed on Jun. 11, 2019, now Pat. No. 10,719,966.

(51) Int. Cl.
| | | |
|---|---|---|
| *G06Q 40/08* | (2012.01) | |
| *G06V 20/20* | (2022.01) | |
| *G06V 20/40* | (2022.01) | |
| *H04N 23/90* | (2023.01) | |

(52) U.S. Cl.
CPC .......... *G06T 2200/24* (2013.01); *G06V 20/20* (2022.01); *G06V 20/41* (2022.01)

(56) References Cited

U.S. PATENT DOCUMENTS

| | | | |
|---|---|---|---|
| 10,032,225 | B1 | 7/2018 | Fox et al. |
| 2004/0111301 | A1 | 6/2004 | Wahlbin et al. |
| 2006/0028488 | A1 | 2/2006 | Gabay et al. |
| 2010/0036683 | A1 | 2/2010 | Logan |
| 2010/0325154 | A1* | 12/2010 | Schloter ............... G06F 16/58 707/705 |
| 2013/0222133 | A1* | 8/2013 | Schultz ............... H04W 4/21 340/539.11 |
| 2014/0368601 | A1 | 12/2014 | Decharms |
| 2015/0029308 | A1 | 1/2015 | Han et al. |
| 2015/0230072 | A1 | 8/2015 | Saigh et al. |
| 2016/0182707 | A1 | 6/2016 | Gabel |
| 2018/0047283 | A1 | 2/2018 | Zhang et al. |
| 2019/0184919 | A1 | 6/2019 | Kamini et al. |
| 2019/0188797 | A1 | 6/2019 | Przechocki et al. |
| 2019/0303463 | A1 | 10/2019 | Catalano et al. |

FOREIGN PATENT DOCUMENTS

| | | |
|---|---|---|
| CN | 102222355 A | 10/2011 |
| CN | 102236909 A | 11/2011 |
| CN | 102930122 B | 2/2013 |
| CN | 105046731 A | 11/2015 |
| CN | 106846459 A | 6/2017 |
| CN | 107065596 A | 8/2017 |
| CN | 108090120 A | 5/2018 |
| TW | 201643063 A | 12/2016 |

OTHER PUBLICATIONS

Final Office Action on U.S. Appl. No. 17/516,439 dated Feb. 22, 2023, 19 pages.

Howard, et al., "Virtual environments for scene of crime reconstruction and analysis," SPIE Proceedings vol. 3960, Visual Data Exploration and Analysis VII, 8 pages (2000).

Ledon, "Reconstruction," retrieved from http://www.expert-accidentologie.fr/reconstruction.html, 2 pages (2006).

Leonetti & Bailenson, "High-Tech View: The Use of Immersive Virtual Environments in Jury Trials," Marquette Law Review 93(3), pp. 1073-1120 (2010).

Notice of Allowance on U.S. Appl. No. 16/884,515 dated Jun. 25, 2021, 5 pages.

Notice of Allowance on U.S. Appl. No. 17/516,439 DTD Nov. 2, 2023.

Office Action on U.S. Appl. No. 17/516,439 dated Aug. 26, 2022, 9 pages.

Office Action on U.S. Appl. No. 17/516,439 dated Jun. 5, 2023, 23 pages.

PC Crash, "PC-Crash—Collision & Trajectory Accident Reconstruction Software," retrieved from http://www.pc-crash.com/, 12 pages (2018).

Schofield, et al., "Interactive Evidence: New Ways To Present Accident Investigation Information," AIMS Research, SCHEME, The University of Nottingham, 13 pages (2004).

Sullivan, "Computer-generated Re-enactments as Evidence in Accident Cases," High Technology Law Journal 3(2), pp. 193-240 (1988).

Virtual Crash, "Virtual CRASH Accident Reconstruction Software," retrieved from https://www.vcrashusa.com/home, 13 pages (2018).

\* cited by examiner

ACCIDENT RE-CREATION USING AUGMENTED REALITY

CROSS-REFERENCE TO RELATED APPLICATIONS

This application is a continuation of U.S. patent application Ser. No. 17/516,439, filed Nov. 1, 2021, which is a continuation of U.S. patent application Ser. No. 16/884,515, filed May 27, 2020, now U.S. Pat. No. 11,164,356, which is a continuation of U.S. patent application Ser. No. 16/438,097, filed Jun. 11, 2019, now U.S. Pat. No. 10,719,966. The contents of these applications are incorporated herein in their entirety by reference.

TECHNICAL FIELD

Aspects of the disclosure generally relate to an augmented reality visualization system. In particular, various aspects of the disclosure provide an augmented reality accident visualization system that provides the capability to re-create an accident.

BACKGROUND

Augmented reality systems may provide a user with a virtual environment based on a real world environment adding digital elements to the real world environment by using a camera or inputted information. Augmented reality systems may provide a user interface allowing a user to interact with the live and/or virtual environment. For example, the user may manipulate electronic representations of objects in the augmented environment. Augmented reality user interfaces may be displayed on display interfaces such as user computing devices and user mobile devices.

When an automobile accident occurs, owners may submit accident reports to police and/or claims under insurance policies that cover the accident. The owner may fill out a police report and a police officer may verify the police report. Additionally, the owner may fill out an insurance claim form listing the damaged areas and an insurer may evaluate the damage against the coverage of an insurance policy. The insurer may provide reimbursement in the form of a settlement, allowing the owner to repair the automobile.

Additionally, processing an insurance claim following a vehicle accident can be a complex and time-consuming process. Individuals involved in the accident must exchange insurance information and file insurance claims. Insurance companies for the individuals involved in the accident must determine the amount of damage caused to the vehicles, pay out on insurance claims, and recover damages from the liable party.

Current claims processing approaches may involve interaction with multiple insurance agents, claims adjusters, subrogation representatives, and the like. Accordingly, current approaches to claims processing may include the processing of paperwork, telephone calls, and face-to-face meetings. As a result, a significant amount of time can elapse between the time the claim is filed and final settlement of the claim. Therefore, a need exists for improved approaches to processing insurance claims in response to a vehicle accident.

SUMMARY

Aspects of the disclosure relate to accident re-creation systems with an augmented reality system (and/or virtual reality system) that facilitate visualization of an accident and re-creation of an accident. The accident re-creation system provides the capability to re-create the accident site on a mobile device before or soon after leaving the scene utilizing augmented reality. Multiple users, such as other witnesses, other drivers, police officers, etc., may also provide input.

According to an embodiment, an accident re-creation system may include a display interface in communication with an augmented reality visualization device and a camera in communication with the augmented reality visualization device. The display interface may be configured to present a graphical user interface comprising an augmented reality accident scene corresponding to a real world location and an accident site and a recommended object listing comprising one or more recommended objects for inclusion in the augmented reality accident scene. The camera may store one or more videos of the real world location and the accident site. Further, the augmented reality visualization device comprises: one or more processors; a first data source configured to store location information corresponding to the real world location and a second data source configured to store accident information corresponding to the accident site. The location information may comprise attributes of the real world location and a prior object listing of one or more prior objects associated with the real world location. The accident information may comprise the one or more videos from the camera. The augmented reality visualization device may further comprise memory storing instructions that, when executed by the one or more processors, cause the augmented reality visualization device to: generate the augmented reality accident scene corresponding to the accident site based at least in part on the accident information and the location information; generate the prior object listing comprising the one or more prior objects based at least in part on the prior object listing, wherein each of the one or more prior objects are associated with the location information; cause display of the augmented reality accident scene and the prior object listing on the display interface; receive first user input comprising a selection of one or more prior objects and an indication of a location in the accident site for the one or more prior objects from the prior object listing from the user; update the augmented reality accident scene to include a representation of the first prior object; and cause display of an updated augmented reality accident scene on the display interface.

In further aspects, the accident re-creation system may include the augmented reality visualization device that further comprises a third data source configured to store user information corresponding to a user, wherein the user information comprises claim information and policy information. The augmented reality visualization device may further comprise a fourth data source configured to store participant information received from other participants in the accident site, wherein the participant information is received from one or more of the following: one or more other drivers, one or more witnesses, or one or more police officers. The augmented reality visualization device may further generate a list of areas of conflict based a comparison of the updated augmented reality accident scene and the participant information from the fourth data source. The camera may be located on a mobile device of the user. The location information may include one or more of the following: road configurations, stop light locations, road signs, lane configurations, trees, or buildings. The accident information may include one or more of the following: vehicles involved in the accident, motorcycles involved in the accident, or pedestrians involved in the accident. The accident information may include one or more speeds of vehicles involved in the accident. The accident information may include a weather description of the accident and a time of day of the accident. The prior objects associated with the real world location may be determined based on the one or more videos associated with the accident site.

According to another embodiment, a method for an accident re-creation system, may comprise the following steps: recording, by a camera in communication with an augmented reality visualization device, one or more videos of an accident site and a real world location of the accident site, wherein the camera is located on a mobile device of a user; receiving, by the augmented reality visualization device, accident information corresponding to the accident site, wherein the accident information comprises the one or more videos from the camera; receiving, by an augmented reality visualization device, location information corresponding to the real world location, wherein the location information comprises attributes of the real world location and a prior object listing of one or more prior objects associated with the real world location; generating, by the augmented reality visualization device, an augmented reality accident scene corresponding to the real world location and the accident site and based on the accident information and the location information; generating, by the augmented reality visualization device, the prior object listing; presenting the augmented reality accident scene and the prior object listing to the user via a display interface on the mobile device; receiving, by the augmented reality visualization device, a selection of one or more prior objects and an indication of a location in the accident site for the one or more prior objects from the prior object listing from the user; updating, by the augmented reality visualization device, the augmented reality accident scene to include a representation of the one or more prior objects selected by the user; and presenting, by the augmented reality visualization device, an updated augmented reality scene on the display interface.

According to yet another embodiment, an accident re-creation system may comprise a display interface in communication with an augmented reality visualization device and a camera located on a mobile device of a user and in communication with the augmented reality visualization device. The display interface may be configured to present a graphical user interface comprising an augmented reality accident scene corresponding to a real world location and an accident site and a recommended object listing comprising one or more recommended objects for inclusion in the augmented reality accident scene. The camera may store one or more videos of the real world location and the accident site. The augmented reality visualization device may comprise: one or more processors; a first data source configured to store location information corresponding to the real world location; a second data source configured to store accident information corresponding to the accident site; and a third data source configured to store participant information from other participants in the accident site. The location information may comprise attributes of the real world location and a prior object listing of one or more prior objects associated with the real world location. The accident information may comprise the one or more videos from the camera. The participant information may be received from one or more of the following: one or more other drivers, one or more witnesses, or one or more police officers. Further, the augmented reality visualization device may comprise memory storing instructions that, when executed by the one or more processors, cause the augmented reality visualization device to: generate the augmented reality accident scene corresponding to the accident site based at least in part on the accident information and the location information; cause display of the augmented reality accident scene on the display interface; and generate a list of areas of conflict based a comparison of the augmented reality accident scene and the participant information from the third data source.

Further the augmented reality visualization device may comprise a fourth data source configured to store vehicle information received from a plurality of sensors located on a vehicle of the user, and further wherein the augmented reality visualization device updates the list of areas of conflict based on a comparison of the augmented reality accident scene, the participant information, and the vehicle information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
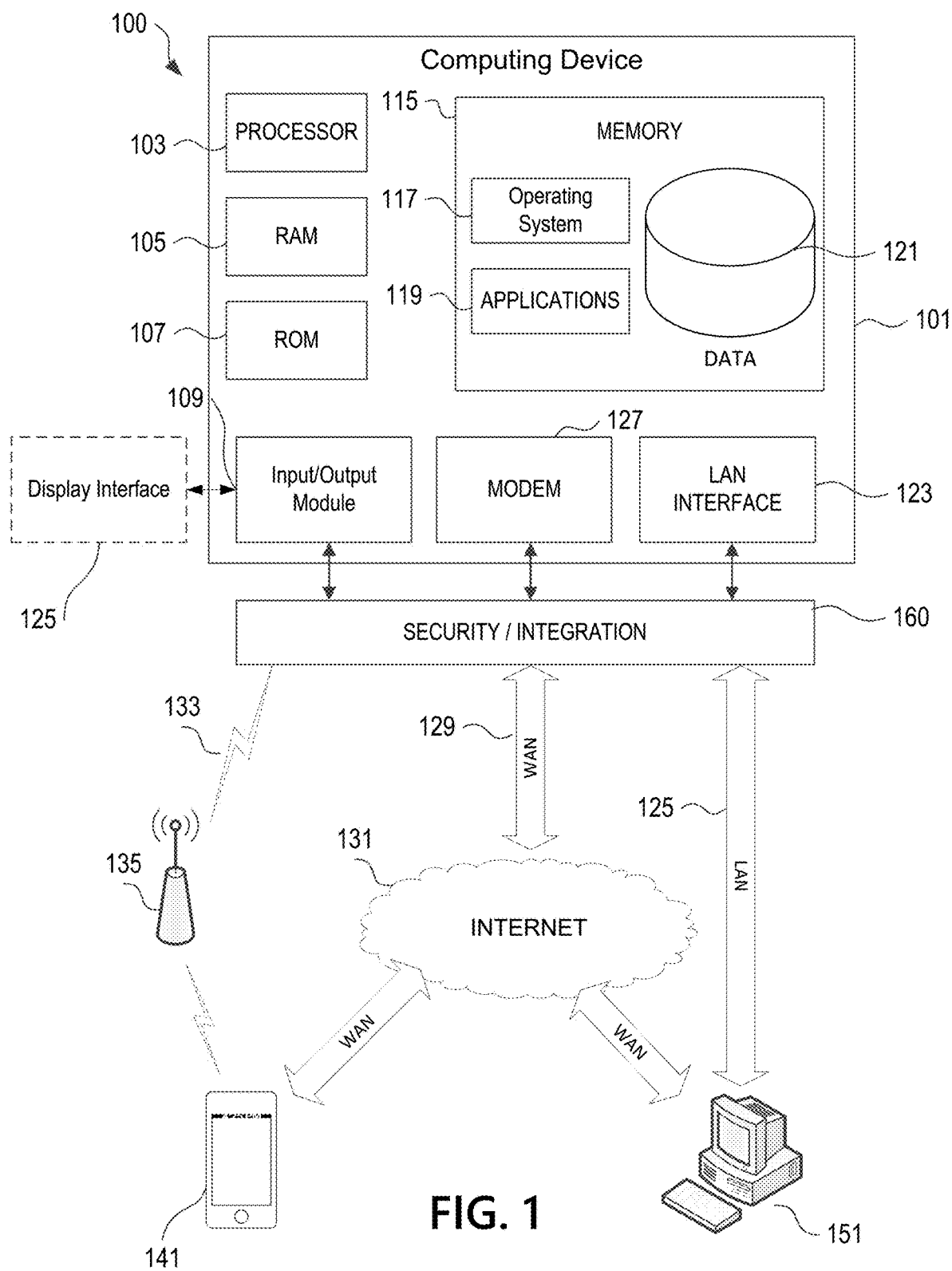
FIG. 1 provides an illustrative special purpose computing device through which various aspects of the disclosure may be implemented.

Aspects of the disclosure generally relate to augmented reality and/or virtual reality visualization systems. In particular, various aspects of the disclosure provide an accident re-creation system with an augmented reality system that facilitates visualization of an accident and re-creation of an accident. The accident re-creation system provides the capability to re-create the accident site on a mobile device before or soon after leaving the scene utilizing augmented reality. Augmented reality may be defined as the mixture of virtual reality superimposed onto a user's view of the real world through a computer device. If the user is able to re-create the accident site on their mobile device before or soon after leaving the accident scene, it could drastically benefit the understanding of everyone involved.

One or more aspects described herein may provide systems, devices, and methods that provide an augmented reality (and/or virtual reality) visualization of a real world accident scene and utilize a recognition engine to facilitate a user's selections of objects for inclusion in the accident scene and re-creation. The system may comprise an augmented reality visualization device in communication with a display interface. The display interface may be configured to present a graphical user interface including an accident scene that corresponds to a real world location. The augmented reality visualization device (and/or system) may comprise one or more data stores configured to store location information corresponding to the real world location, such as streets, intersections, buildings, trees, road objects, etc. The augmented reality visualization device may also comprise one or more data stores configured to store accident site information corresponding to the accident site, such as vehicles, motorcycles, speeds, and movements. The accident scene data store may also include one or more videos of the accident scene taken by the user or other witnesses after the accident. The one or more data stores may also store user information corresponding to a user of the user device or a user covered by one or more insurance policies. The user information may include details related to an insurance claim made by the user. Additionally, the one or more data stores may also store participant information corresponding to details about other multiple participants, such as witnesses, other drivers, and/or police officers.

The accident re-creation system may provide the capability to re-create the accident site on a mobile device before or soon after leaving the scene utilizing augmented reality. Using their mobile device, the user would be able to open a mobile application and begin filming the accident site. Using premade animations and icons, the user can insert cars, motorcycles, trees, or other important objects involved in their accident to help rebuild the scene. Additionally, the user can add any pertinent information from the scene, such as the weather or time of day (i.e. raining, hailing, ice storm, sunny, very dark, etc.). Then the user can set the speed of different objects with known values or generic values, such as the other person's car (i.e. "slow," "very fast," etc.). Upon adding all necessary objects, the user can replay the scene on their device to have an accurate representation of the accident.

Multiple users, such as other witnesses, other drivers, police officers, etc., may also provide input. By leveraging multi-user support, the accident could be allocated as a group, allowing all members of the accident and any external witnesses to re-create the accident individually. Then, by either manual interpretation of automatic detection, areas of conflict between the original user and other witness accounts may be identified within the augmented reality system. Additionally, the documentation and accident files for all involved may be linked together within one source.

Although embodiments described above generally utilized augmented reality visualizations of a real world location and accident scene, in some embodiments the system may be implemented utilizing virtual reality techniques. While augmented reality systems may generate displays of virtual objects and present them to a user such that the objects appear to occupy the real world location and accident scene itself, virtual reality systems may provide a user with a display of a real world location and accident scene corresponding to the real world accident site. For example, smart glasses may provide a user with an augmented reality experience by projecting virtual objects onto a field of vision of a user. These techniques may create the appearance that the virtual objects are present in the real world location and accident scene or other real world environment. One of ordinary skill in the art will readily recognize that the many features described above in the context of augmented reality systems may also be implemented using these virtual reality techniques.

According to some embodiments, the system may use augmented reality techniques to display the virtual representations of selected objects such that they appear to the user to be placed in the real world location and accident scene. Augmented reality techniques may present the virtual representations to the user as part of the real world location and accident scene. The accident re-creation system and embodiments thereof described in the context of augmented reality systems may utilize virtual reality techniques to provide similar functionality and information, but may display the virtual representation of objects into the real world location and accident scene rather than overlay the virtual representations of objects onto the real world location and accident scene.

Augmented reality may allow the system to provide a user with further flexibility in visualizing a real world location and accident scene, such as by dynamically representing objects in the real world location and accident scene (both existing and real objects) and allowing users to move the virtual objects within the real world location and accident scene. By transforming existing/real objects into virtual representations, in some embodiments, the system may allow a user to visualize how the real world location and accident scene may have occurred to accommodate accident re-creation.

In accordance with one or more aspects described herein, the augmented reality visualization device (and/or system) may generate an augmented reality representation of the accident scene. The accident scene may be based on the dimensions of the real world location and accident scene, objects known to be present at the location, and/or any other suitable information about the real world location and accident scene. The augmented reality visualization device may also generate a list of recommended objects for the user to select for inclusion in the real world location and accident scene and/or preselect one or more recommended objects. The augmented reality visualization device may select the recommended objects for inclusion in the list of recommended objects based at least in part on the known prior objects associated with the real world location and accident scene. The augmented reality visualization device may transmit and/or otherwise cause display of the augmented reality representation and the list of recommended objects on the display interface.

However, before discussing these and other aspects further, discussion will turn to an example augmented reality visualization device that may be used to implement one or more aspects described herein, as shown in FIG. 1.

FIG. 1 illustrates a block diagram of an augmented reality visualization device (or server) 101 in a computer system 100 (e.g., an augmented reality visualization system) that may be used according to one or more illustrative embodiments of the disclosure. The augmented reality visualization device 101 may be a specially configured computing device and may have one or more processors 103 for controlling overall operation of the augmented reality visualization device 101 and its associated components, including one or more memory units (e.g., RAM 105, ROM 107), an input/output module 109, and a memory 115. The augmented reality visualization device 101, along with one or more additional devices (e.g., terminals 141 and 151, security and integration hardware corresponding to an integration layer 160) may correspond to an augmented reality visualization system configured as described herein for generating a display of a real world location and accident scene and facilitating the re-creation of the accident.

The input/output (I/O) 109 may include one or more user interfaces, such as a camera, microphone, keypad, touch screen, and/or stylus through which a user of the computing device 101 may provide input, and may also include one or more of a speaker for providing audio output and a video display device for providing textual, audiovisual and/or graphical output. For example, the input/output 109 may be communicatively coupled with a display interface 125. Display interface 125 may comprise any suitable display device, such as a monitor or display panel integrated into the augmented reality visualization device 101 in some embodiments. In other embodiments, display interface 125 may be associated with a user device in communication with the augmented reality visualization device 101 and operative to display the real world location and accident scene as generated by the augmented reality visualization device 101. Software may be stored within memory 115 and/or storage to provide instructions to processor 103 for enabling device 101 to perform various actions. For example, memory 115 may store software used by the device 101, such as an operating system 117, application programs 119, and an associated database 121 (such as the accident information, user information, and participant information databases discussed further herein). The application program 119 may be detailed further as the augmented reality visualization application 210. The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the device 101 to execute a series of computer-readable instructions, for example, to generate an augmented reality accident scene corresponding to a real world accident site and generate a list of recommended objects for inclusion in the augmented reality accident scene.

The augmented reality visualization device 101 (e.g., a user device, a server computer, an insurance provider computer hardware memory and processor system, an insurance clearinghouse computer memory and processor device, etc.) may operate in a networked environment (e.g., the computing system 100) supporting connections to one or more remote computers, such as terminals 141 and 151. The terminals 141 and 151 may be personal computers, servers (e.g., web servers, database servers), clients, or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency and/or a site associated with an insurance provider. The network connections depicted in FIG. 1 include a local area network (LAN) 125 and a wide area network (WAN) 129, and a wireless telecommunications network 133, but may also include other networks. When used in a LAN networking environment, the augmented reality visualization device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the augmented reality visualization device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless telecommunications network 133.

Also illustrated in FIG. 1 is a security and integration layer 160, through which communications may be sent and managed between the augmented reality visualization device 101 and the remote devices (terminals 141 and 151) and remote networks (networks 125, 129, and 133). The security and integration layer 160 may comprise one or more computing devices, such as web servers, authentication servers, and various networking components (e.g., firewalls, routers, gateways, load balancers, etc.), having some or all of the elements described above with respect to the augmented reality visualization device 101. As an example, security and integration layer 160 may comprise a set of web application servers configured to use secure protocols and to insulate the augmented reality visualization device 101 (e.g., one or more servers, a workstation, etc.) from external devices (e.g., terminals 141 and 151). In some cases, the security and integration layer 160 may correspond to a set of dedicated hardware and/or software operating at the same physical location and under the control of same entities as the augmented reality visualization device 101. For example, the integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from the augmented reality visualization device 101 may include secure and sensitive data, such as insurance customer and policy data. Therefore, it may be desirable to protect the data transmission by using secure network protocols and encryption, and also to protect the integrity of the data stored when on the augmented reality visualization device 101 using the security and integration layer 160 to authenticate users and restrict access to unknown or unauthorized users. In various implementations, security and integration layer 160 may provide, for example, a file-based integration scheme or a service-based integration scheme. In filed-based integration, data files may be transmitted to and from the augmented reality visualization device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the augmented reality visualization device 101 and/or security and integration layer 160. The web services may be accessed by authorized external devices and users to support input, extraction, and manipulation of the data in the augmented reality visualization device 101. Web services built to support to the system 100 may be cross-domain and/or cross-platform, and may be built for enterprise use. Such web services may be developed in accordance with various web service standards, such as the Web Service Interoperability (WS-I) guidelines. In some examples, system web services may be implemented in the security and integration layer 160 using the Secure Sockets Layer (SSL) or Transport Layer Security (TLS) protocol to provide secure connections between the augmented reality visualization device 101 and various clients (e.g., terminals 141 and 151) attempting to access, insert and/or manipulate data within the system 100. SSL or TLS may use HTTP or HTTPS to provide authentication and/or confidentiality. In some cases, system web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the system 100, may include one or more caches, for example, CPU caches used by the processing unit (e.g., the processor 103), page caches used by the operating system 117, disk caches of a hard drive, and/or database caches used to cache content from the database 121. For embodiments including a CPU cache, the CPU cache may be used by one or more processors in the processing unit (e.g., the processor 103) to reduce memory latency and access time. In such examples, a processor 103 may retrieve data from or write data to the CPU cache rather than reading/writing to memory 115, which may improve the speed of these operations. In some examples, a database cache may be created in which certain data from the database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119, such as an augmented reality claims processing application, may be used by the augmented reality visualization device 101 within the system 100, including computer executable instructions for generating an accident scene corresponding to a real world location, generating a list of recommended objects for inclusion in the real world location and accident scene, and receiving user selections of objects for inclusion in the real world location and accident scene.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2A:
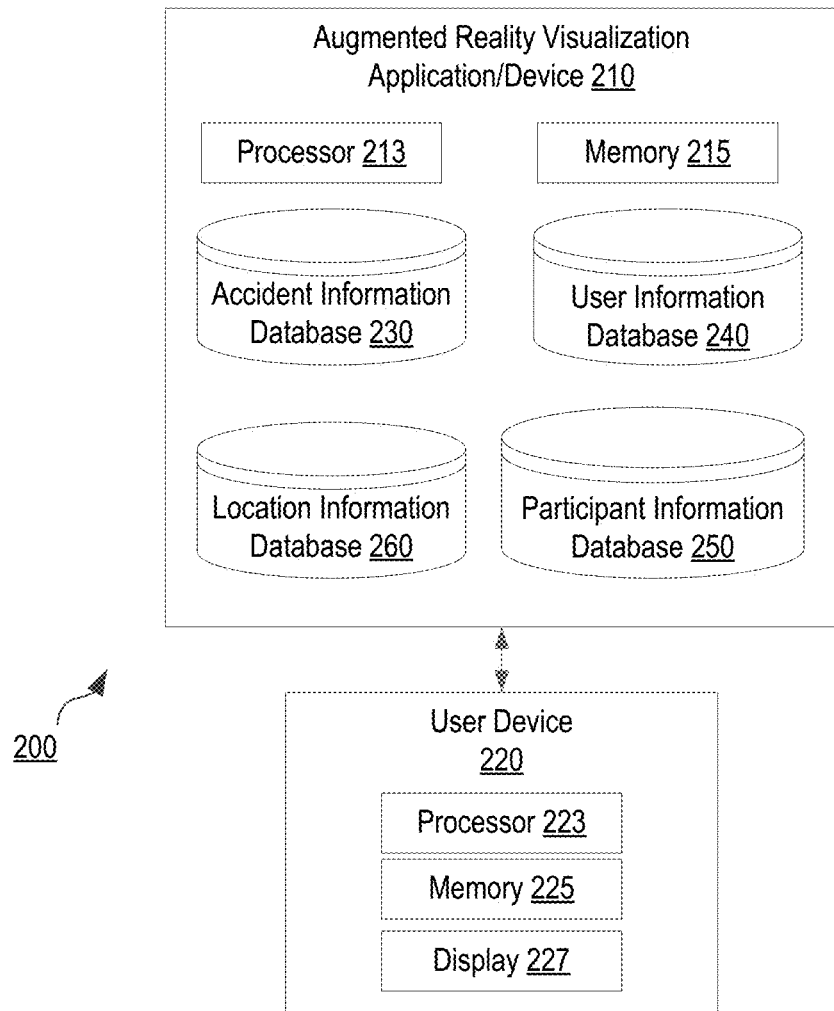
FIG. 2A provides an illustrative block diagram of a system that may be used to implement the processes and functions of certain aspects of the present disclosure.

Referring to FIG. 2, an illustrative system 200 for implementing methods for re-creating an accident scene in an accident re-creation application/device according to the present disclosure is shown. As illustrated, the accident re-creation system 200 may include an augmented reality visualization application/device 210, a user device 220, an accident information database 230, user information database 240, participant information database 250, and display interface 227. Although FIG. 2 illustrates user device 220 as a separate device from the augmented reality visualization application/device 210, it should be readily appreciated that the application/device 210 and the user device 220 may be combined into a single device without departing from the disclosure herein. Further, display interface 227 may be connected to and/or integrated within user device 220 or augmented reality visualization application/device 210. The augmented reality visualization application/device 210 and user device 220 may possess many of the same hardware/software components as augmented reality visualization device 101 shown in FIG. 1.

The augmented reality visualization application/device 210 may comprise one or more processors 213 and memory 215. As illustrated in FIG. 2, the augmented reality visualization application/device 210 may comprise an accident information database 230, user information database 240, participant information database 250, location information database 260.

The accident information database 230 may store information about the real world accident site/scene. Other features and attributes of the real world accident may also be recorded by the user in the accident information database 230, such as the cars and/or motorcycles involved in the accident or located in the area at the time of the accident, speed of different objects with any known values or generic values, such as "slow," "very fast." Lastly, the user will be able to add any pertinent information from the scene, such as the weather or time of day (i.e. raining, hailing, ice storm, sunny, very dark, etc.) in the accident information database 230. Additionally, the accident information database 230 may include one or more videos from the user filming and videoing the accident site with the camera on the user's mobile device. The user may film with the camera through the application on the user's mobile device.

The user information database 240 may store information about insured users, such as claim information, policy information, and other attributes associated with the user. The participant information database 250 may store information received from other participants, such as other witnesses, other drivers, police officers, etc.

The location information database 260 may store information about the real world location. The information about the real world location site may include, for example, locations, intersections, street names, directions, and any other suitable feature that characterizes the real world location. Additionally, the location information database 260 may include information such as road configurations, stop lights, road signs, lane configurations, trees, buildings, and other important objects involved in the accident to help rebuild the scene. The location information database 260 may connect to or be in communication with a mapping database that includes information about the real world location, such as intersections, street names, directions, and any other suitable feature that characterizes the real world location site.

Although one particular configuration is illustrated, in other implementations one or more devices may be combined with other devices and/or divided into multiple devices. For example, some embodiments may store the accident information database 230, user information database 240, participant information database 250, and location database 260 on separate devices from the augmented reality visualization application/device 210.

The augmented reality visualization application/device 210 may be configured to re-create an augmented reality accident scene corresponding to a real world location site. According to some aspects, the application/device 210 may generate the augmented reality accident scene based on mapping information stored by location information database 260 such as locations, intersections, street names, directions, and any other suitable feature that characterizes the real world location site. The augmented reality visualization application/device 210 may also be configured to generate a recommended object list or listing based at least in part on a list of prior objects stored in the location information database 260. The location information database 260 may store information about prior objects in the accident location obtained from previous accidents at this accident site.

The real world location and accident scene and list of recommended items may be used to generate a user interface for presentation to a user via display interface 227. The user device 220 may include a processor 223, memory 225, and a display interface 227. The user device 220 may be configured to interface with the augmented reality visualization application/device 210 to generate a display of the user interface. The user device 220 may receive user input from the user selecting one or more recommended objects for inclusion in the real world location and accident scene. This information may be provided to the augmented reality visualization application/device 210 for generation of an updated display of the real world location and accident scene comprising the selected objects.

Figure 2B:
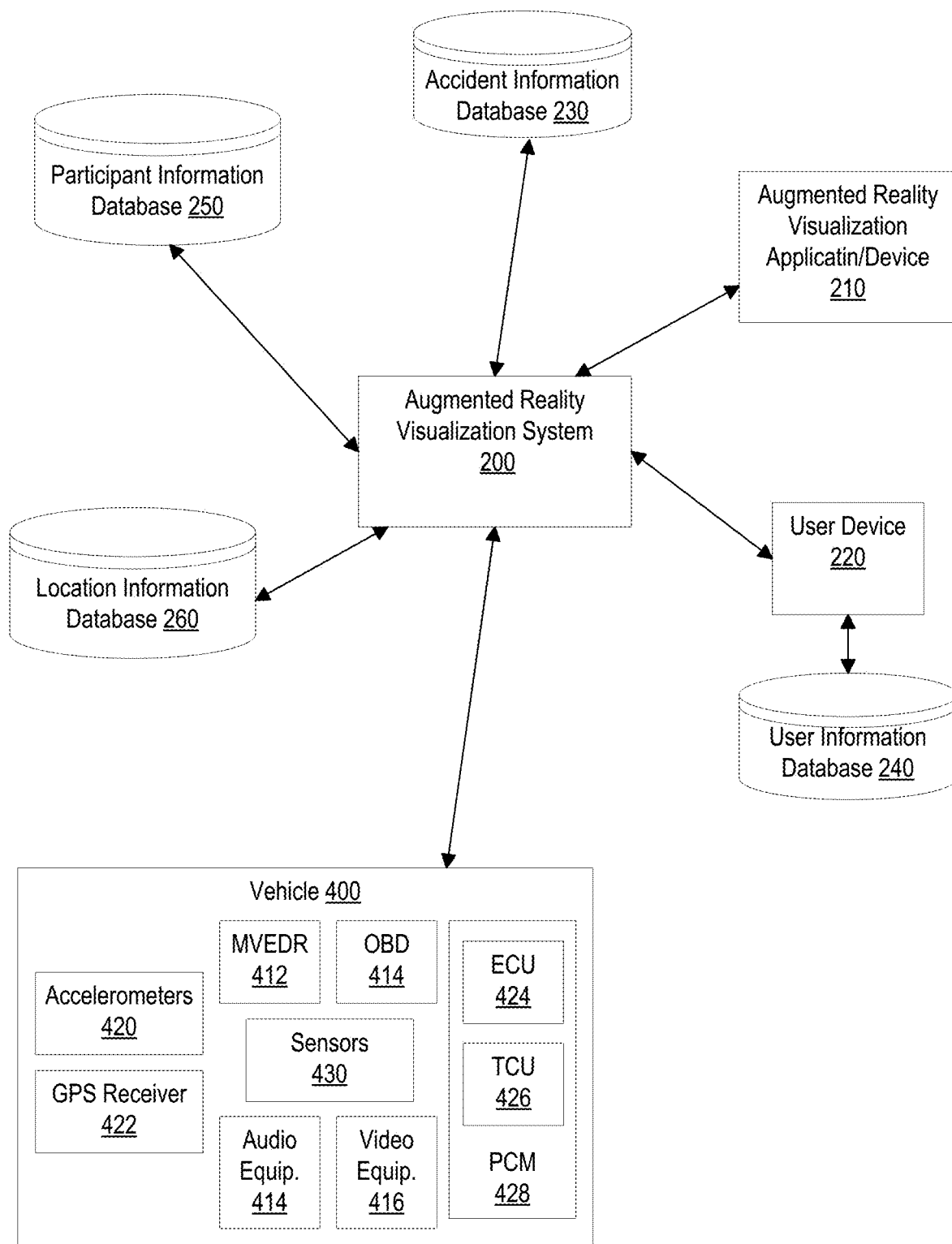
FIG. 2B provides another illustrative block diagram of a system that may be used to implement the processes and functions of certain aspects of the present disclosure.

FIG. 2B illustrates an example accident re-creation system 200. As illustrated in FIG. 2B, the accident re-creation system 200 may include many different inputs. The accident re-creation system 200 may be connected to and/or in communication with each of these various inputs and sources of information. Each of these inputs and sources of information may or may not be utilized with the accident re-creation system 200 in accordance with aspects of this invention. The accident re-creation system 200 may include for example, an augmented reality visualization application/device 210, a user device 220, an accident information database 230, a user information database 240, a participant information database 250, and a location information database 260. Additionally, the accident re-creation system 200 may be connected to and/or in communication with one or more of the vehicles 400 involved in the accident.

As explained above, the accident information database 230 may store information about a real world location such as road configurations, stop lights, road signs, lane configurations, trees, and other important objects involved in the accident to help rebuild the scene. Other features and attributes of the real world location may also be recorded by the user in the accident information database 230, such as the cars and/or motorcycles involved in the accident or located in the area at the time of the accident, speed of different objects with any known values or generic values, such as "slow," "very fast." Lastly, the user will be able to add any pertinent information from the scene, such as the weather or time of day (i.e. raining, hailing, ice storm, sunny, very dark, etc.) in the accident information database 230.

The user information database 240 may store information about insured users, such as claim information, policy information, and other attributes associated with the user.

The participant information database 250 may store information received from other participants, such as other witnesses, other drivers, police officers, etc. The other participants and witnesses may provide information, such as speed of vehicles, interpretation of the accident site, direction of travel, etc. Additionally, the other participants and witnesses may re-create the accident individually, utilizing the augmented reality visualization application/device 210.

The location database 260 may store information about the real world location. The information about the real world location site may include, for example, locations, intersections, street names, directions, and any other suitable feature that characterizes the real world location. Additionally, the location information database 260 may include information such as road configurations, stop lights, road signs, lane configurations, trees, buildings, and other important objects involved in the accident to help rebuild the scene. The location information database 260 may connect to or be in communication with a mapping database that includes additional information about the real world location.

The one or more vehicles 400 that are included in the accident may include further information from sensors and other systems on the vehicle 400. For example, the vehicle 400 may include a motor vehicle event data recorder (MVEDR) 410 that records telematics data and/or an on-board diagnostic unit (OBD) 412 that monitors vehicle systems, devices, and components and provides diagnostic data relating to the health, status, or condition of these components. The MVEDR 410 and ODB 412 may include one or more respective memories (not shown) for storing and retaining data relating to the condition, status, or operation of the vehicle 400 for both normal driving events and collision events. The vehicle 400 may additionally include and be in signal communication with one or more recording devices, e.g., audio recording equipment 414 and video recording equipment 416 (A/V equipment) that respectively records audio data and video data at the vehicle. The vehicle 402 may also include other components and sensors, for example, one or more accelerometers 420 (e.g., triaxial accelerometers) and a location determination device 422 such as a Global Positioning System (GPS) receiver for determining the geographic location of the vehicle.

The MVEDR 410 may also be referred to a vehicle "black box" (e.g., a crash-proof memory device) that records vehicle telematics data. Vehicle telematics data may include, for example, directional acceleration and deceleration (e.g., forward/backward, left/right, up/down), change in directional acceleration, vehicle speed or velocity, engine throttle and RPM (revolutions per minute), steering input, engagement of various vehicle subsystems (e.g., stability control systems, antilock brake systems), and the like. Those skilled in the art will appreciate that the MVEDR 410 may be configured to collect and record other types of data relating to the operation and status of the vehicle 402 prior to or during a vehicle event.

The OBD 412 is a system configured to continuously monitor various components of the vehicle 402 such as the powertrain, chassis, and body of the vehicle as well as various automotive devices. The OBD 412 may collect and report automotive diagnostic data in accordance with the OBD-II protocol standard. The OBD 412 may be in signal communication with an engine control unit (ECU) 424 and the transmission control unit (TCU) 426 of a powertrain control module (PCM) 428 to monitor and record diagnostic data from these components. The OBD 412 (as well as the ECU 424 and TCU 426) may be in signal communication with various automotive sensors 430 throughout the vehicle 402 that provide sensor data relating to various systems, components, and devices of the vehicle including, for example, the engine, transmission, chassis, body, and the like. The sensors 430 may thus indicate the status and condition of these vehicle components. Sensors 430 may also include sensors that can detect the status and condition of the vehicle wheels and tires as well as sensors that can detect damage to the panels of the vehicle body, e.g., deformations, dents, punctures, and so forth. Those skilled in the art will appreciate that the automotive sensors 430 may include, for example, temperature sensors, pressure sensors, angular position sensors, linear position sensors, rotational motion sensors, inertial sensors, and the like. The automotive sensors 430 may be externally installed sensors, such as those installed for insurance or safety reasons, such as Drivewise® sensors.

Figure 3:
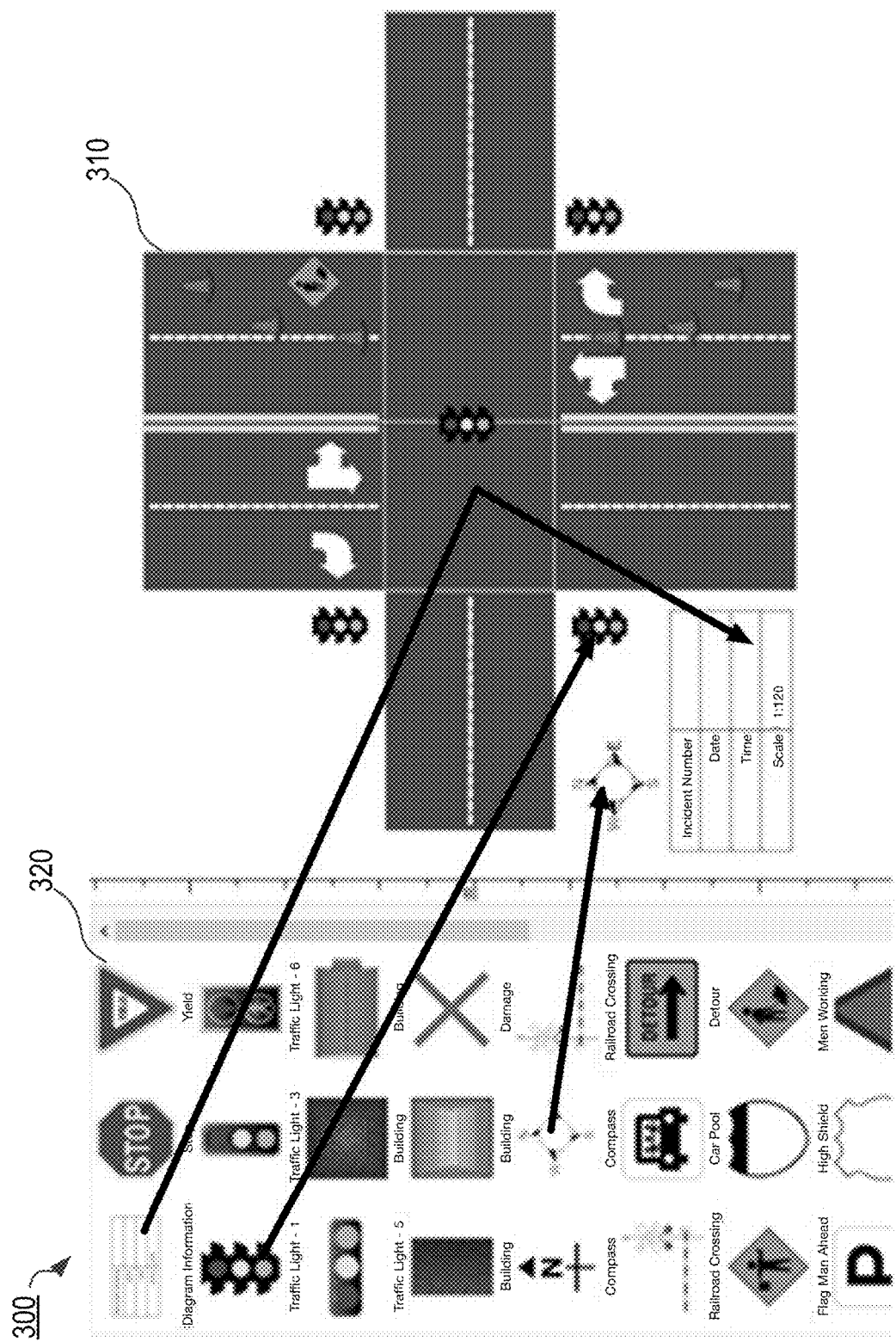
FIGS. 3, 4, and 5 provide illustrative examples of graphical user interfaces according to one or more embodiments of the present disclosure.
Figure 4:
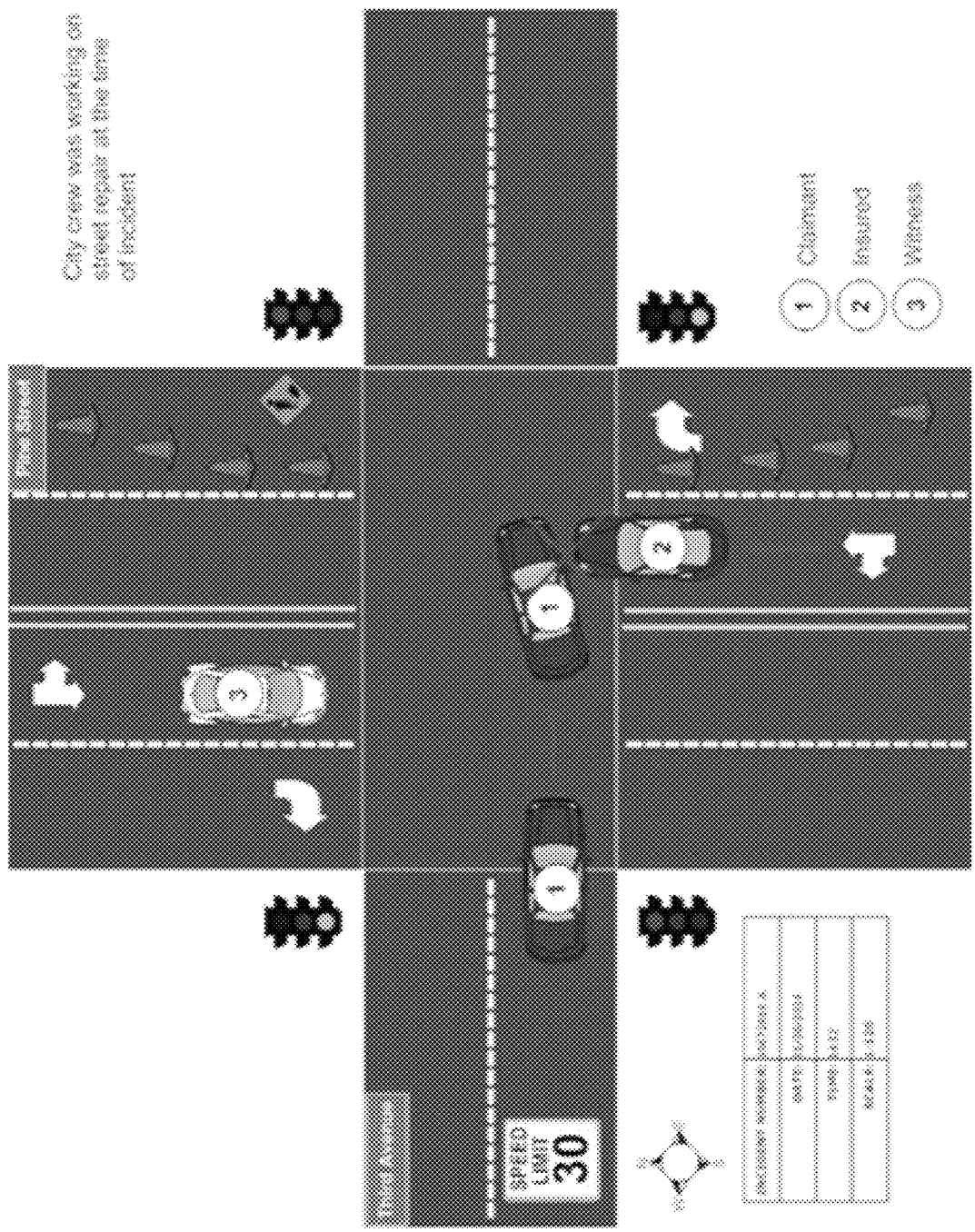
Figure 5:

Having discussed an illustrative special purpose computer and operating environment in which one or more aspects described herein may be implemented, a detailed discussion of one or more aspects will proceed with respect to the sample user interfaces of FIGS. 3, 4, and 5. The sample user interfaces of FIGS. 3, 4, and 5 are 2D examples of this concept. However, this invention would allow for an augmented, realistic 3D replay of the accident scene. These sample user interfaces do represent the similar functionality with the concept of dragging over necessary objects and/or indicators to clearly portray what took place during the accident.

FIG. 3 illustrates a first example user interface 300 comprising an augmented reality representation of a real world accident scene in the form of an accident site 310. The user interface may comprise the accident site 310 and an object list 320. The user interface may be generated by an augmented reality visualization application/device 210, a user device 220, and/or both in concert as part of the accident re-creation system 200. The generated user interface may be displayed to a user via display interface 227 or other display interface communicatively coupled to the augmented reality visualization system, for example.

In the example of FIG. 3, the accident site 310 may be originally illustrated without any objects therein other than a street depiction. The accident re-creation system 200 may generate an accident site 310 based on information about a corresponding real world location site and display the accident site 310 on a display interface 227. A user may use the object list 320 with premade animations and icon to insert important objects involve in the accident to help rebuild the scene. The user may use a drag and drop feature on the display interface 227 from the object list 320 to the accident site 310. The information about the real world location site may include, for example, locations, intersections, street names, directions, and any other suitable feature that characterizes the accident site. The accident site 310 may be a three-dimensional representation of the real world. Use of a three-dimensional augmented reality model may provide the user with an immersive experience as well as enable them to better visualize how the real world accident site 310 may look with new objects installed.

The accident re-creation system 200 may gather visual and/or sensory information from the real world accident site 310 using cameras and other sensors and determine the attributes of the accident site based on the gathered information. For example, the accident re-creation system 200 may determine a set of physical dimensions or identify outlets and other features of the accident site based on image data captured by a camera of a user device. Using the mobile device, the user would open the augmented reality visualization application and begin filming the accident site.

The accident re-creation system 200 may populate the augmented reality accident site with the filmed accident site from the user and one or more objects known to the system to occupy the real world accident site or other features of the real world accident site, such as premade animations and icons. The user would also be able to insert cars, motorcycles, trees, or other important objects involved in the accident to help rebuild and re-create the accident scene. Additionally, the user will be able to add any pertinent information from the scene, such as the weather or time of day (i.e., raining, hailing, ice storm, sunny, very dark, etc.).

In other embodiments, the system may automatically detect the presence and identity of objects and features in the real world accident site 310 based on visual and/or sensory information captured using cameras and other sensors. Some examples of objects that the augmented reality system may present in the augmented reality accident scene include buildings, trees, traffic lights, lane divisions, lane structure, turning lanes, construction zones, and other objects. Information about the prior objects that occupied the real world accident site may be stored in the accident information database 230 based on information reported by another user for another accident or based on information determined from an analysis of the captured visual and/or sensory information.

FIG. 4 illustrates a second example user interface 350 that may be generated based on all of the information input by the user. FIG. 5 illustrates another example user interface 500 of a 3D augmented reality representation of an accident scene according to aspects of this invention.

Having discussed many aspects of the disclosure with reference to the illustrative user interfaces shown in FIGS. 3, 4, and 5 discussion will now turn to an illustrative method according to one or more aspects described herein.

Figure 6:
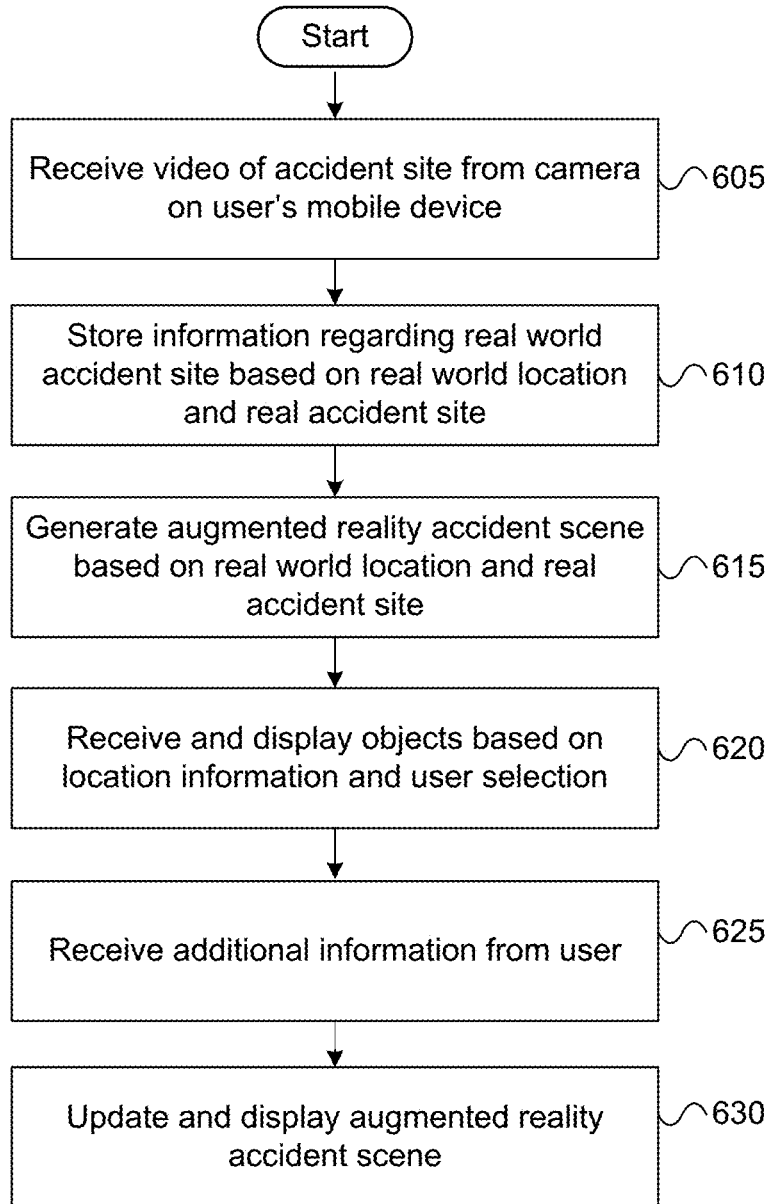
FIG. 6 provides an illustrative method for providing an augmented reality accident scene system in accordance with certain aspects of the disclosure.
Figure 7:
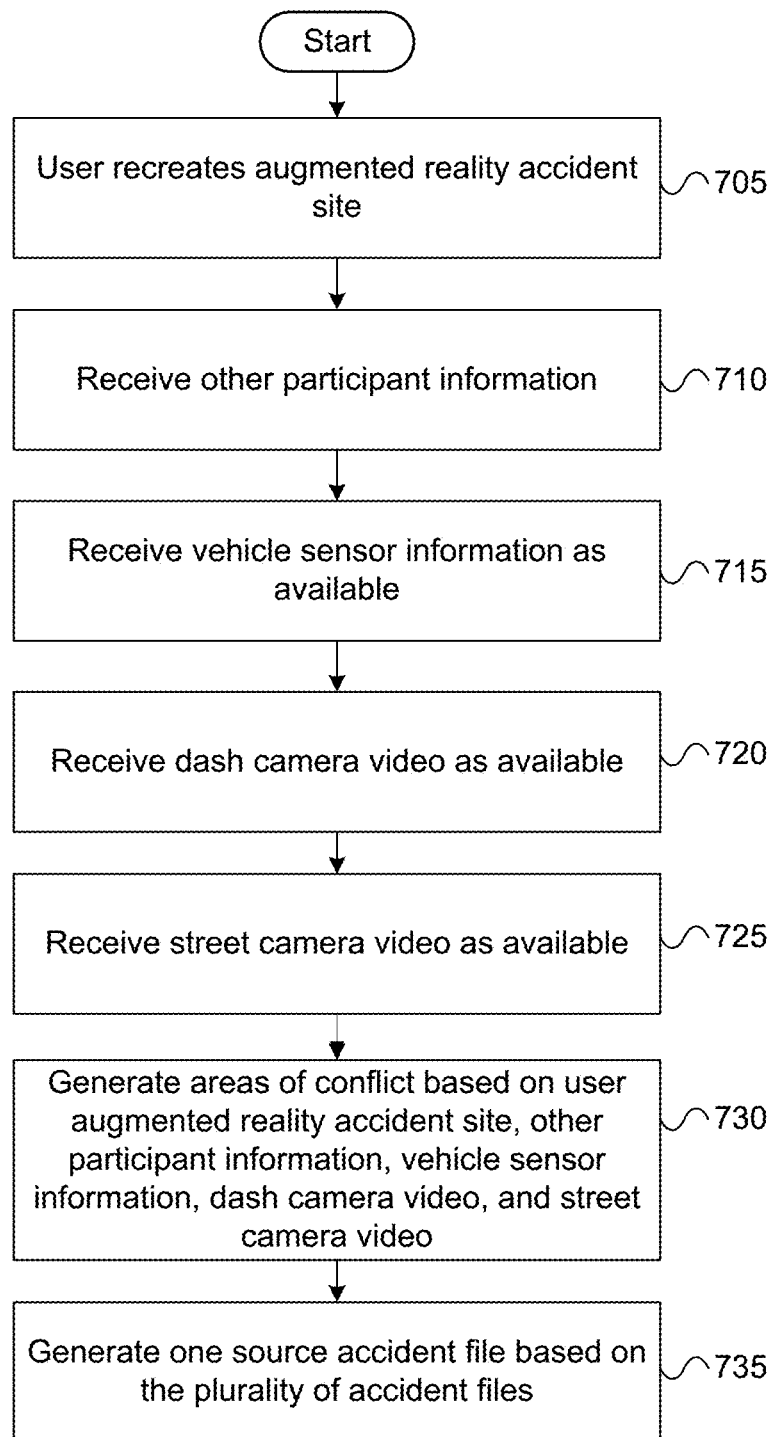
FIG. 7 provides another illustrative method for providing an augmented reality accident scene system in accordance with certain aspects of the disclosure.

FIGS. 6 and 7 illustrate example methods of generating an augmented reality visualization for re-creating an accident scene. FIG. 6 illustrates a method of generating an augmented reality visualization by an individual for re-creating an accident scene. FIG. 7 illustrates a method of generating an augmented reality visualization using multiple users, other pertinent information, and the deconfliction of information for re-creating an accident scene. The methods illustrated in FIGS. 6 and 7 may be performed by a special-purpose computing application/device, such as augmented reality visualization application/device 210. The methods may be performed by and or embodied in the accident re-creation system 200, augmented reality realization application/device 210, user device 220, and/or any other suitable combination thereof. Although discussed briefly here, it is to be understood that the varied features discussed above with respect to FIGS. 3, 4, and 5 may be incorporated in the methods illustrated in FIGS. 6 and 7 as appropriate.

At step 605, a user may open the augmented reality visualization application 210 on a user device 220 or mobile device as part of the accident re-creation system 200. The user would then begin filming the accident scene with a camera in communication with the accident re-creation system 200, to include the vehicles, the streets, and other pertinent objects within the accident scene.

At step 610, the augmented reality visualization system (and/or device) may store information regarding a real world accident site. As described above, such information may comprise the filming of the accident scene, physical attributes of the accident site, and other information describing one or more features of the accident site (such as the location of traffic lights, etc.). The system may store information regarding one or more objects in the accident site and their locations. The system may also store information regarding one or more past objects reported or determined to be present at the accident location. These past objects may be the subject of a previously reported accident in the accident information database 230. The system may provide automatic scanning features operative to analyze visual and/or sensory data captured in the real world accident scene. For example, the system may capture a 360-degree scan (including, potentially, horizontal and vertical to capture the whole accident site) of the accident site and detect the presence and identity of objects therein.

At step 615, the system may generate an augmented reality accident site based on the accident site information associated with the real world location. The augmented reality accident scene may be generated to be an augmented/virtual representation similar to the real world location. Information about the objects in the accident site and other features may be utilized to improve the accuracy of the augmented reality accident site. Video and image data captured by a user device 220 may be utilized for the generation of the augmented reality accident site.

At step 620, the system may receive and display objects based on user information and user selection. For example, the user may select objects from the object list 320 to be included with the augmented reality accident site. Using premade animations and icons, the user may insert objects involved in their accident to help rebuild the accident scene, such as inserting cars, motorcycles, trees, traffic lights, or other important objects.

At step 625, the system may receive any additional information from the user. The user may add any other pertinent information from the accident scene, such as the weather or time of day (i.e. raining, hailing, ice storm, sunny, very dark, etc.). The user may also be able to set the speed of different objects with known values or the use of generic values, such as the other person's car (i.e. "slow," "very fast," etc.).

At step 630, the system may generate and display (or cause to be displayed) a user interface comprising a replay and video of the updated and final augmented reality accident scene. The system generates a re-creation of the accident scene from the user's inputs. The user interface may be displayed on a display interface such as display interface 227 of FIG. 2. The user interface may present a three dimensional view of the augmented reality accident scene and the system may receive user input from the user to navigate within and interact with the augmented reality accident scene.

FIG. 7 illustrates a method of generating an accident re-creation with augmented reality visualization using multiple users, other pertinent information, and the deconfliction of information for re-creating an accident scene.

At step 705, the system receives a user-generated augmented reality accident scene representing a re-creation of an accident. The user may re-create the augmented reality accident scene as described above in FIG. 6 and steps 605 through 630. However, one might assume that a user could simply leave out details or purposely create a fraudulent accident scene. The following steps help to improve the accuracy and validity of the re-creation of the accident and provide a one source for linking all accident files for documentation for all parties involved.

At step 710, the system receives participant information. The participant information may include information from one or more of the members of the accident, police officers, and other witnesses to the accident. The participant information may include accident reports, witness statements, or witness information, such as speed of vehicles, direction of vehicles, vehicles following traffic rules and/or traffic signs, or other information pertinent to the re-creation and verification of the accident. Additionally, the speeds of vehicles and/or direction of vehicles may be provided by computerized accident estimation models. The participant information may include verbal recitations, in which the system may include an automated language translation feature to convert the verbal recordings to text. The participant information may include the augmented reality accident scene from any of the other members of the accident and/or other witnesses as provided through the augmented reality visualization application/device 210. The system may also allow witnesses or police officers to sign and agree with specific re-creations as an added form of validity. The system may utilize this participant information to validate and confirm the accident re-creation with augmented reality visualization.

At step 715, the system receives vehicle sensor information as available. As described above, one or more of the vehicles may include sensor information from such sources as the on-board diagnostic unit (OBD), the motor vehicle event data recorder (MVEDR), the powertrain control module (PCM), vehicle GPS information, and/or accelerometer information. The system may utilize this sensor information to validate and confirm the accident re-creation with augmented reality visualization.

At step 720, the system receives dash camera video as available. One or more of the vehicles involved in the accident may have a dash camera installed. Additionally, one or more of the witness vehicles around the accident may have a dash camera installed. The system may consolidate and store the videos from any dash cameras available. The system may utilize one or more of the various dash camera videos to validate and confirm the accident re-creation with augmented reality visualization.

At step 725, the system receives street camera video as available. One or more of the streets around the accident may have a street camera installed. Additionally, one or more of the building locations around the accident may have a street camera installed. The system may consolidate and store the videos from any street cameras available. The system may utilize one or more of the various street camera videos to validate and confirm the accident re-creation with augmented reality visualization.

At step 730, the system generates areas of conflict based on the user augmented reality accident scene, participant information, vehicle sensor information, dash camera video, and street camera video. The system may analyze and compare the information from the user augmented reality accident scene, participant information, vehicle sensor information, dash camera video, and/or street camera video. The system may automatically generate the areas of conflict or the system may manually generate the areas of conflict in accordance with aspects of this invention.

At step 735, the system generates one source accident file based on the plurality of accident files. In an embodiment of this invention, the system may leverage multiple user input by allocating each accident as an accident group. The system may output and provide documentation for all those involved in the accident so that all accident files and information can be linked together within one accident source document.

Aspects of the disclosure have been described in terms of illustrative embodiments thereof. Numerous other embodiments, modifications and variations will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Additionally, those skilled in the art will appreciate that there are numerous variations and permutations of the above-described systems and techniques that fall within the spirit and scope of the invention as set forth in the appended claims.

What is claimed is:

1. A computing system comprising:
   one or more processors; and
   one or more storage devices, wherein at least one of the one or more storage devices stores instruction code executable by at least one of the one or more processors to cause the computing system to perform operations comprising:
      receiving, from a camera in communication with the computing system, one or more videos of an accident site and a real-world location of the accident site;
      detecting, based on the one or more videos of the accident site and the real-world location of the accident site, a presence of one or more objects at the accident site;
      identifying the one or more objects detected at the accident site;
      generating, based at least in part on the identity of the one or more objects detected at the accident site, an augmented reality accident scene corresponding to the real-world location and the accident site;
      generating a graphical user interface comprising the augmented reality accident scene corresponding to the real-world location and the accident site;
      receiving, via the graphical user interface and from a user, user input regarding one or more of the one or more identified objects or the augmented reality accident scene; and
      based on the user input, storing one or more of the one or more identified objects for inclusion in a prior object listing associated with the real-world location such that a subsequently generated augmented reality accident scene corresponding to the real-world location is depicted in a subsequently generated graphical user interface that also depicts an object listing section that includes one or more object indications associated respectively with the one or more identified objects that were included in the prior object listing based on the user input.

2. The computing system according to claim 1, wherein the computing system is in communication with a storage device that stores user information corresponding to the user, wherein the user information comprises insurance claim information and insurance policy information.

3. The computing system according to claim 1, wherein the camera is located on a mobile device of the user.

4. The computing system according to claim 1, wherein the computing system is in communication with a storage device that stores location information that comprises object information associated with one or more objects at particular locations, wherein the object information specifies one or more of: road configurations, stop light locations, road signs, lane configurations, trees, or buildings, wherein generating the graphical user interface comprising the augmented reality accident scene corresponding to the real-world location and the accident site comprises:
   selecting, from the location information, object information associated with one or more objects at the real-world location; and
   generating the graphical user interface based at least in part of the selected object information.

5. The computing system according to claim 1, wherein the computing system is in communication with a storage device that stores accident information, wherein the accident information specifies information associated with one or more of: vehicles involved at the accident site, motorcycles involved at the accident site, or pedestrians involved at the accident site, wherein generating the graphical user interface comprising the augmented reality accident scene corresponding to the real-world location and the accident site comprises:
   generating the graphical user interface based at least in part the accident information.

6. The computing system according to claim 5, wherein the accident information includes one or more speeds of vehicles involved at the accident site.

7. The computing system according to claim 5, wherein the accident information includes a weather description of the accident site and a time of day of the accident site.

8. The computing system according to claim 1, wherein the real-world location is determined based on the one or more videos associated with the accident site.

9. The computing system according to claim 1, wherein the instruction code causes the computing system to perform further operations comprising:
generating, via the graphical user interface, a replay video of the augmented reality accident scene, wherein the graphical user interface presents a three-dimensional view of the augmented reality accident scene.

10. The computing system according to claim 1, wherein the instruction code causes the computing system to perform further operations comprising:
receiving, via the graphical user interface, a user input command to navigate within and interact with the augmented reality accident scene.

11. Non-transitory computer-readable media having stored thereon instructions that, when executed by one or more processors of a computing system, causes the computing system to perform operations comprising:
receiving, from a camera in communication with the computing system, one or more videos of an accident site and a real-world location of the accident site;
detecting, based on the one or more videos of the accident site and the real-world location of the accident site, a presence of one or more objects at the accident site;
identifying the one or more objects detected at the accident site;
generating, based at least in part on the identity of the one or more objects detected at the accident site, an augmented reality accident scene corresponding to the real-world location and the accident site;
generating a graphical user interface comprising the augmented reality accident scene corresponding to the real-world location and the accident site;
receiving, via the graphical user interface and from a user, user input regarding one or more of the one or more identified objects or the augmented reality accident scene; and
based on the user input, storing one or more of the one or more identified objects for inclusion in a prior object listing associated with the real-world location such that a subsequently generated augmented reality accident scene corresponding to the real-world location is depicted in a subsequently generated graphical user interface that also depicts an object listing section that includes one or more object indications associated respectively with the one or more identified objects that were included in the prior object listing based on the user input.

12. The non-transitory computer-readable media according to claim 11, wherein the computing system is in communication with a storage device that stores user information corresponding to the user, wherein the user information comprises insurance claim information and insurance policy information.

13. The non-transitory computer-readable media according to claim 11, wherein the camera is located on a mobile device of the user.

14. The non-transitory computer-readable media according to claim 11, wherein the computing system is in communication with a storage device that stores location information that comprises object information associated with one or more objects at particular locations, wherein the object information specifies one or more of: road configurations, stop light locations, road signs, lane configurations, trees, or buildings, wherein generating the graphical user interface comprising the augmented reality accident scene corresponding to the real-world location and the accident site comprises:
selecting, from the location information, object information associated with one or more objects at the real-world location; and
generating the graphical user interface based at least in part of the selected object information.

15. The non-transitory computer-readable media according to claim 11, wherein the computing system is in communication with a storage device that stores accident information, wherein the accident information specifies information associated with one or more of: vehicles involved at the accident site, motorcycles involved at the accident site, or pedestrians involved at the accident site, wherein generating the graphical user interface comprising the augmented reality accident scene corresponding to the real-world location and the accident site comprises:
generating the graphical user interface based at least in part the accident information.

16. The non-transitory computer-readable media according to claim 15, wherein the accident information includes one or more speeds of vehicles involved at the accident site.

17. The non-transitory computer-readable media according to claim 15, wherein the accident information includes a weather description of the accident site and a time of day of the accident site.

18. The non-transitory computer-readable media according to claim 11, wherein the real-world location is determined based on the one or more videos associated with the accident site.

19. The non-transitory computer-readable media according to claim 11, wherein the instructions cause the computing system to perform further operations comprising:
generating, via the graphical user interface, a replay video of the augmented reality accident scene, wherein the graphical user interface presents a three-dimensional view of the augmented reality accident scene.

20. A computer-implement method comprising:
receiving, from a camera in communication, one or more videos of an accident site and a real-world location of the accident site;
detecting, based on the one or more videos of the accident site and the real-world location of the accident site, a presence of one or more objects at the accident site;
identifying the one or more objects detected at the accident site;
generating, based at least in part on the identity of the one or more objects detected at the accident site, an augmented reality accident scene corresponding to the real-world location and the accident site;
generating a graphical user interface comprising the augmented reality accident scene corresponding to the real-world location and the accident site;
receiving, via the graphical user interface and from a user, user input regarding one or more of the one or more identified objects or the augmented reality accident scene; and
based on the user input, storing one or more of the one or more identified objects for inclusion in a prior object listing associated with the real-world location such that a subsequently generated augmented reality accident scene corresponding to the real-world location is depicted in a subsequently generated graphical user interface that also depicts an object listing section that includes one or more object indications associated respectively with the one or more identified objects that were included in the prior object listing based on the user input.

* * * * *